(12) United States Patent
Walstrom et al.

(10) Patent No.: US 7,806,240 B2
(45) Date of Patent: Oct. 5, 2010

(54) SURGE BRAKE ACTUATOR

(75) Inventors: Todd Walstrom, Weston, WI (US); Eric Anderson, Plover, WI (US); Todd Krzanowski, Mosinee, WI (US); Matt Block, Rothschild, WI (US); Kawa-She-Quoen Okerlund, Wittenburg, WI (US)

(73) Assignee: Cequent Trailer Products Inc., Mosinee, WI (US)

( * ) Notice: Subject to any disclaimer, the term of this patent is extended or adjusted under 35 U.S.C. 154(b) by 507 days.

(21) Appl. No.: 11/894,117

(22) Filed: Aug. 20, 2007

(65) Prior Publication Data

US 2009/0050419 A1    Feb. 26, 2009

(51) Int. Cl.
*B60T 7/20* (2006.01)
(52) U.S. Cl. .................................. 188/112 R; 188/3 H
(58) Field of Classification Search ................. 188/2 D, 188/3 H, 112 R, 151 A; 280/432, 446.1
See application file for complete search history.

(56) References Cited

U.S. PATENT DOCUMENTS

| | | | |
|---|---|---|---|
| 2,354,268 A | 7/1944 | McNamara, Jr. | |
| 2,706,536 A | 4/1955 | Scott | |
| 3,144,101 A | 8/1964 | Hahn | |
| 3,768,606 A | 10/1973 | Mizen et al. | |
| 3,796,287 A | 3/1974 | Kolm | |
| 3,881,577 A | 5/1975 | Wherry et al. | |
| 4,223,766 A | 9/1980 | Huetsch et al. | |
| 4,239,252 A | 12/1980 | Huetsch et al. | |
| 4,402,523 A | 9/1983 | Knowles | |
| 4,817,978 A | 4/1989 | James | |
| 4,840,256 A | 6/1989 | Webb | |
| 4,889,212 A | 12/1989 | Temple | |
| 5,013,059 A | 5/1991 | Goettker | |
| 5,246,243 A | 9/1993 | Carr | |
| 5,464,078 A | 11/1995 | Pittman | |
| 5,485,900 A | 1/1996 | Denny | |
| 5,492,204 A | 2/1996 | Wallace | |
| 5,551,539 A * | 9/1996 | Frymiare ................. 188/112 R |
| 5,678,664 A | 10/1997 | Marasco | |
| 5,771,996 A | 6/1998 | Marasco | |
| 5,855,418 A | 1/1999 | Greaves, Jr. | |
| 6,035,977 A | 3/2000 | Marasco | |
| 6,375,211 B1 | 4/2002 | MacKarvich | |
| 6,386,337 B2 | 5/2002 | Pribula et al. | |
| 7,143,874 B2 * | 12/2006 | Roll et al. ................ 188/112 R |
| 2003/0201141 A1 * | 10/2003 | Frye ........................ 188/112 R |

FOREIGN PATENT DOCUMENTS

GB    2077867    12/1981

OTHER PUBLICATIONS

Demco—Dethmers Manufacturing Company—DA10 Actuator Operator's Manual, dated Mar. 25, 1999.

* cited by examiner

*Primary Examiner*—Christopher P Schwartz
(74) *Attorney, Agent, or Firm*—McDonald Hopkins LLC

(57) ABSTRACT

A surge brake actuator having a coupler housing telescopically engagable with an actuator housing is provided. The surge brake actuator incorporates an improved reverse lockout assembly that prevents movement of the coupler housing with respect to the actuator housing during reverse movement of a towing vehicle. The reverse lockout assembly is capable of moving to an operating position upon forward movement of the towing vehicle. A breakaway cam effectuates actuation of a braking system of a towed vehicle if the towing vehicle breaks away from the towed vehicle.

20 Claims, 11 Drawing Sheets

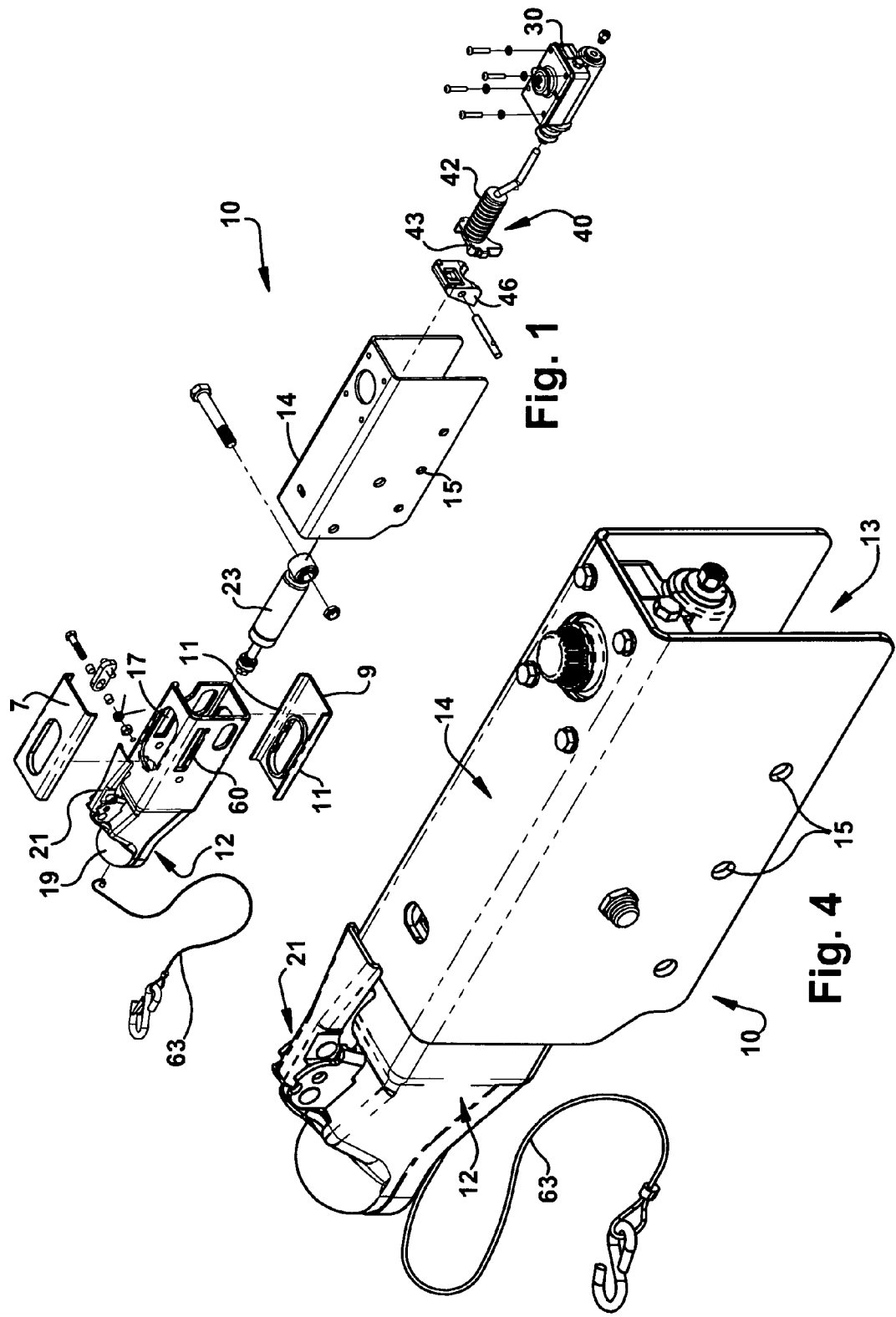

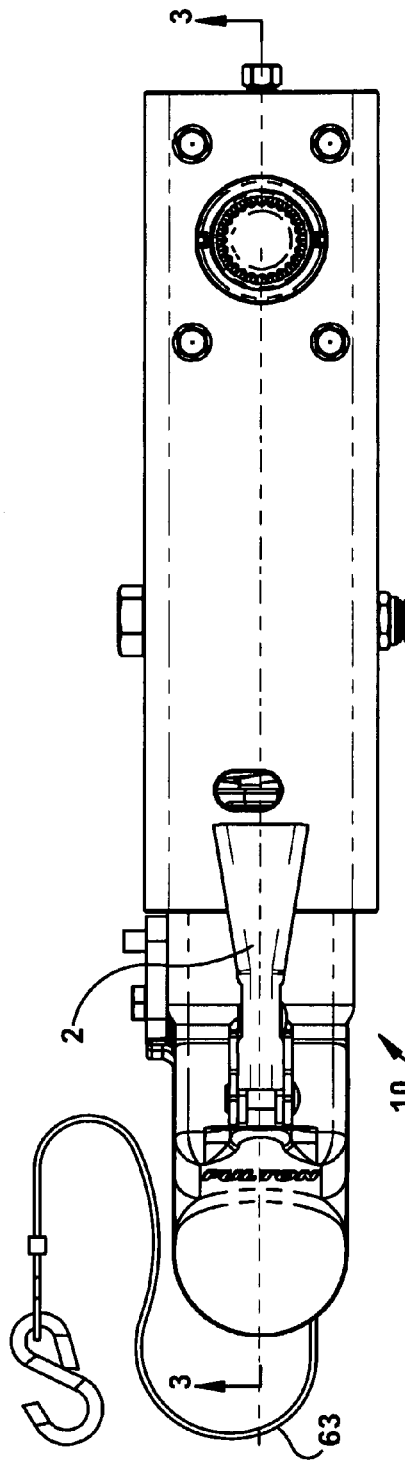
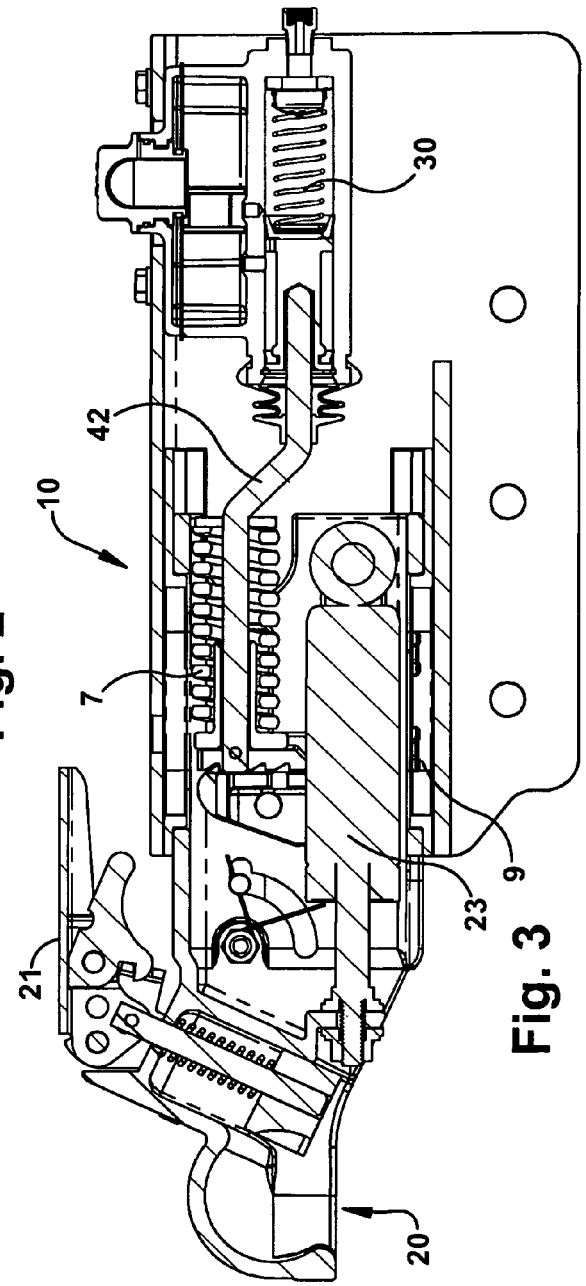

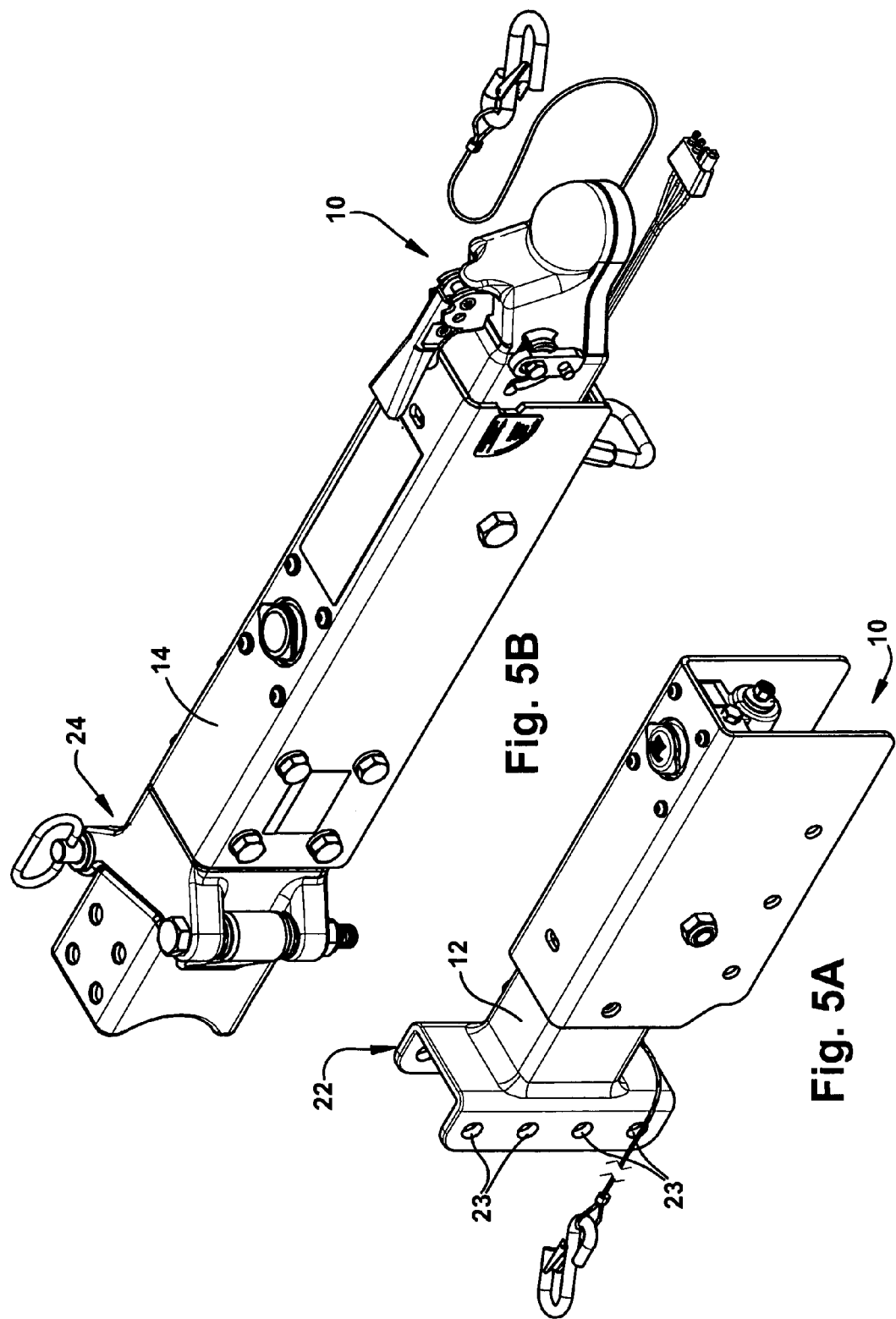

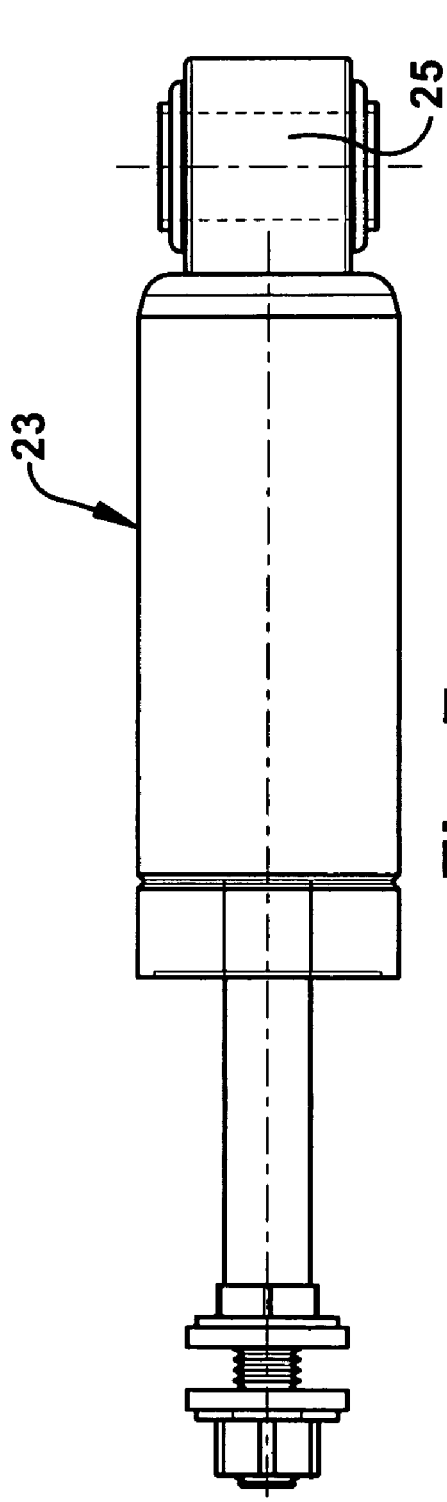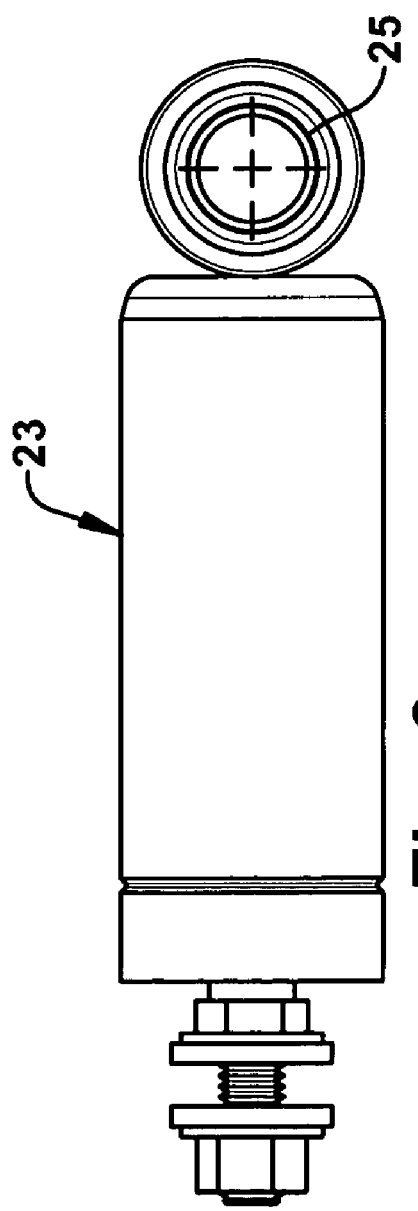
Fig. 7
Fig. 6

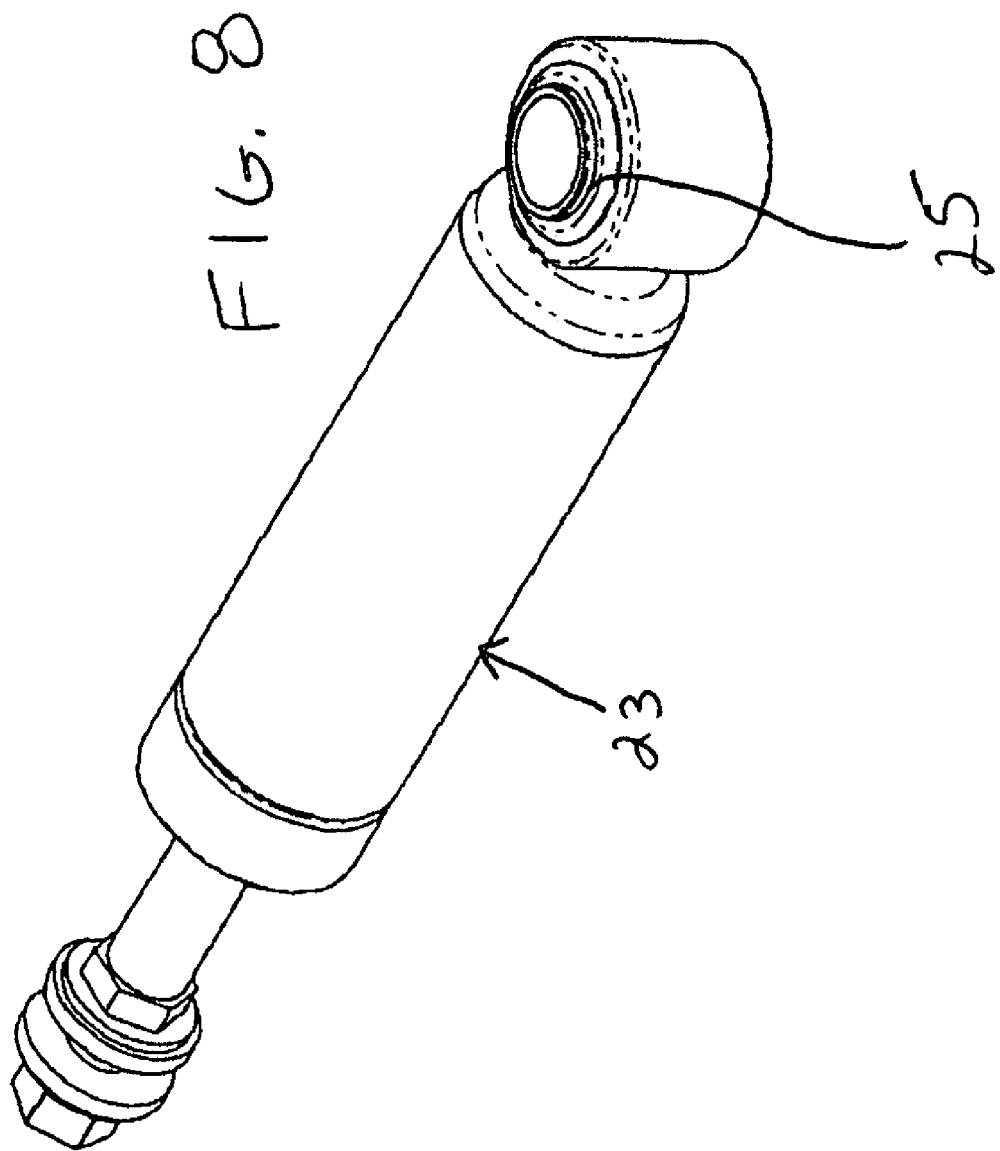

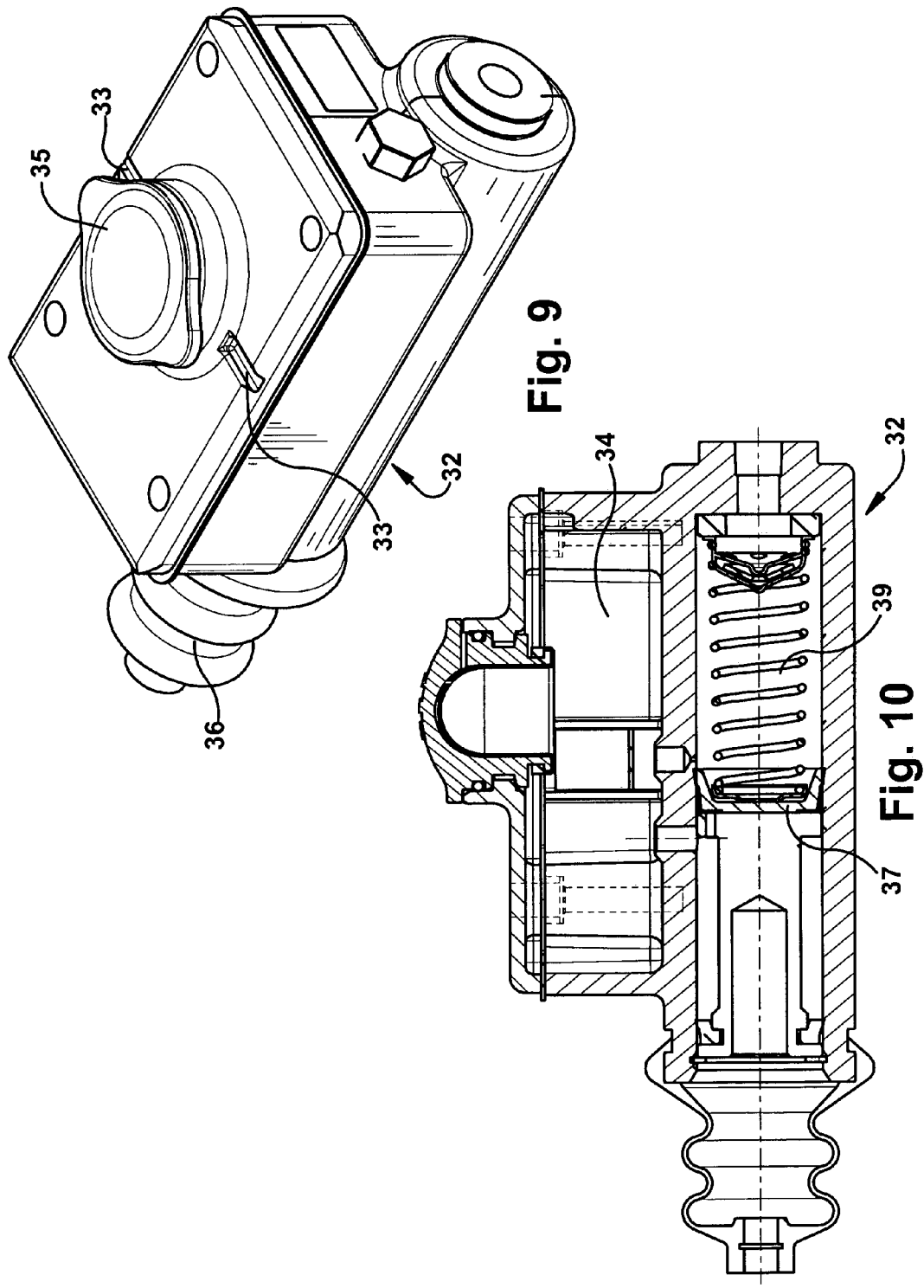

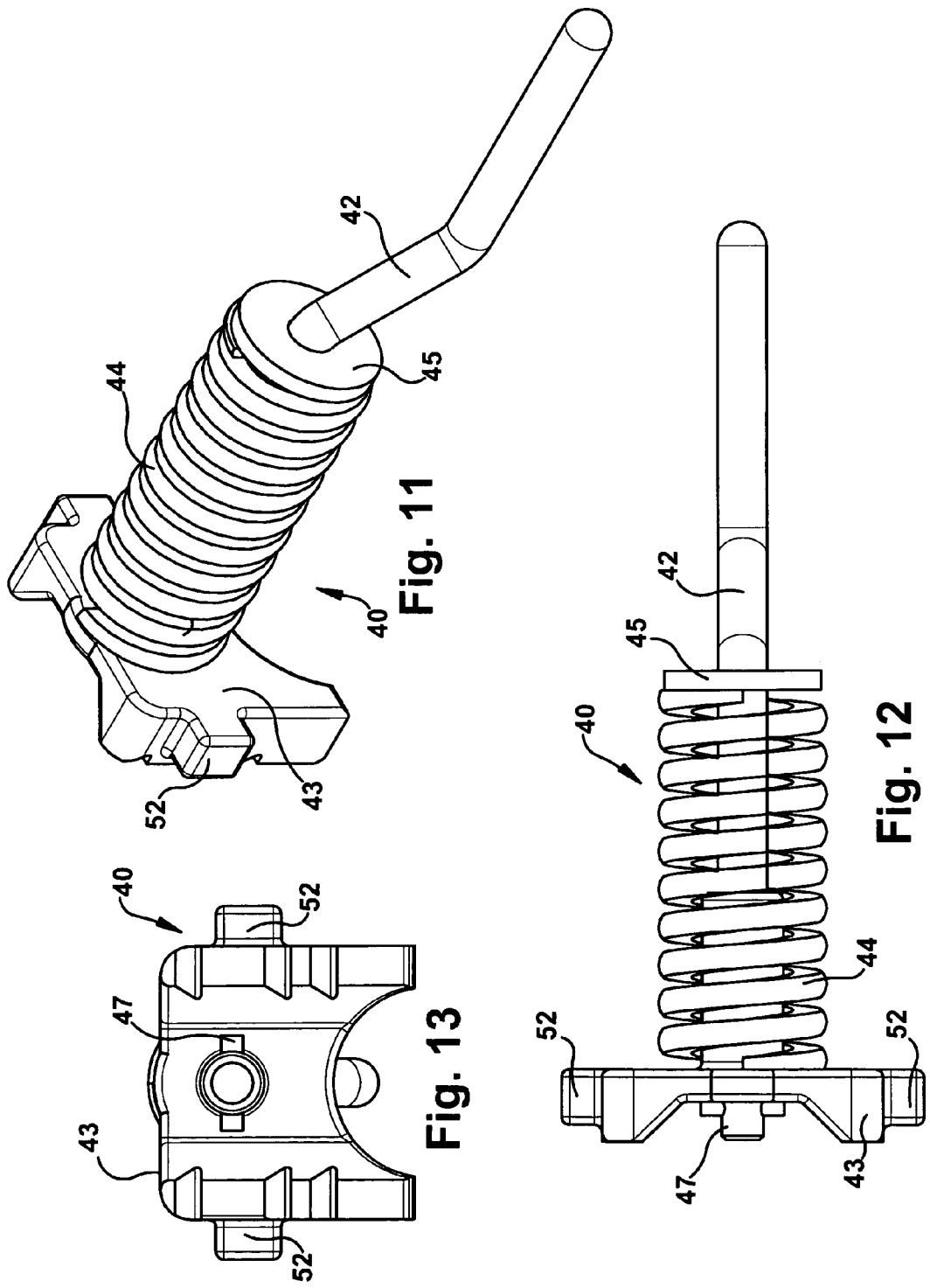

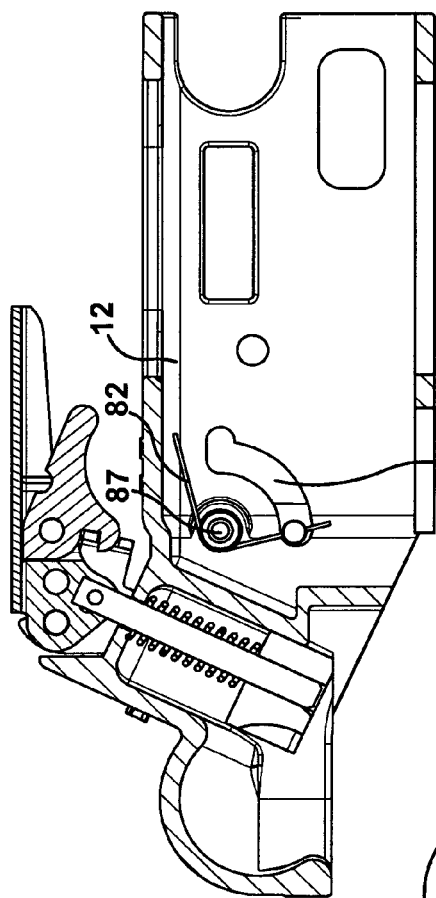
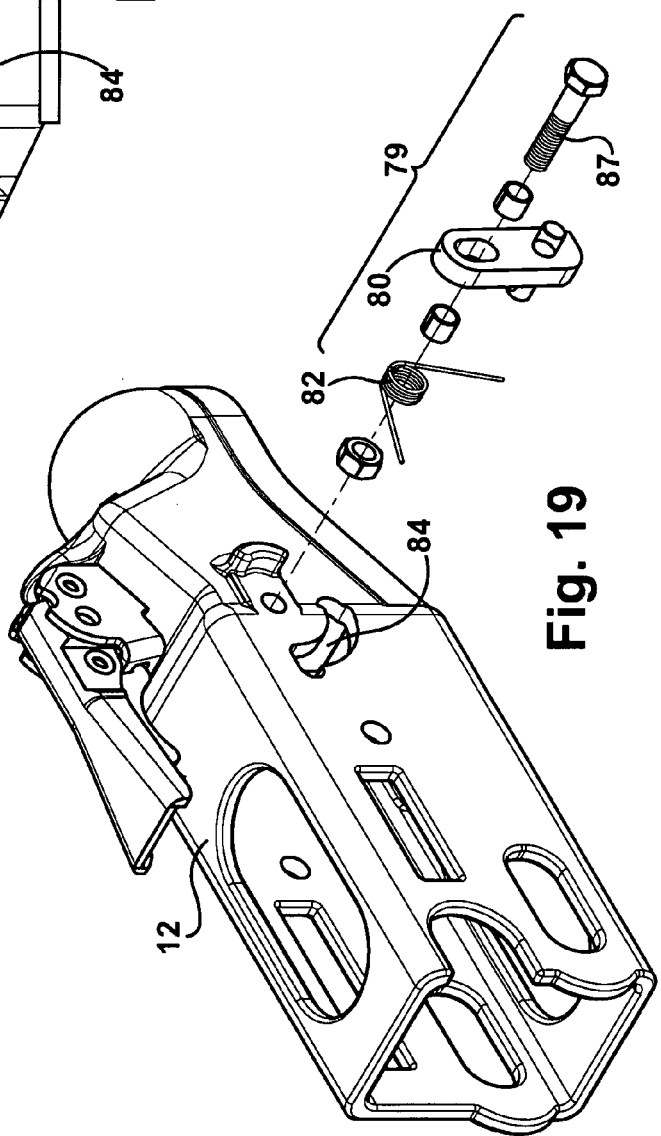
Fig. 20
Fig. 19

SURGE BRAKE ACTUATOR

FIELD AND BACKGROUND OF THE INVENTION

The present invention relates to a surge brake actuator used in transporting a towed vehicle with a towing vehicle. Particularly, the present invention relates to a surge brake actuator for actuating a braking mechanism or system of a towed vehicle.

For towed vehicles, such as trailers, it is common to provide a self-contained hydraulic braking system that operates independently of the braking system on the towing vehicle. A surge brake actuator is usually connected between the towing vehicle and the towed vehicle so that towed vehicle moves with the towing vehicle. In addition, the surge brake actuator permits the towed vehicle to utilize its own braking system when the towing vehicle brakes.

The surge brake actuator generally includes a coupler housing component attached to the towing vehicle and a hydraulic cylinder component that actuates the braking system of the towed vehicle. The surge brake actuator operates such that when the towing vehicle brakes, the forward momentum of the towed vehicle applies a force on the coupler housing attached to the towing vehicle. The hydraulic cylinder utilizes the resultant force on the coupler housing component to actuate the braking system of the towed vehicle. Specifically, the resultant force is translated into fluid pressure within the hydraulic cylinder to activate the braking system of the towed vehicle.

The output pressure of the braking system is a function of the ability of the brake actuator to convert the forces provided by the towing vehicle into hydraulic pressure so as to actuate the braking system of the towed vehicle. This force/pressure ratio is an important component in the ability of an actuator to provide braking pressure to the towed vehicle. To date, normal use of various designs of brake actuators fail to efficiently convert the decelerating force to fluid pressure. Reasons for such inefficient conversion of the decelerating force to fluid pressure include: a build-up of road debris in the actuator; corrosion or rust bonding of actuator components; high frictional loss from actuator components; and coupler housing interference.

In addition, breakaway mechanisms may be incorporated into surge brake actuators. These mechanisms generally operate through a breakaway mechanism, which typically comprises a lanyard having one end operably connected to the brake actuator. In the event that the towed vehicle detaches or breaks away from the towing vehicle during operation, the lanyard typically triggers the braking system of the towed vehicle to stop the towed vehicle.

More specifically, the breakaway mechanism is usually designed so that, when the towed vehicle breaks away or is otherwise disconnected, the lanyard is separated from the surge brake actuator but remains attached to the towing vehicle. As the towing vehicle pulls the cable, the cable actuates the braking system of the towed vehicle prior to detaching from the surge brake actuator. To prevent the cable from retracting and prematurely releasing the towed vehicle brake, a friction lock is generally used to maintain pressure on the cable. However, such frictional locks occasionally prematurely trigger the braking system of the towed vehicle, causing damage to the surge brake actuator, the towed vehicle, and/or the towing vehicle.

For example, during connection and disconnection of the towed vehicle from the towing vehicle, the lanyard is often pulled or tugged toward the towing vehicle. A slight tug is often enough to slightly actuate the braking system of the towed vehicle. This slight activation can cause excessive wear on the braking system of the towed vehicle and an excessive burden on the towing vehicle, causing decreased fuel mileage and increased maintenance costs. Over time, this excessive burden may cause premature lining wear or overheating of the braking system of the towed vehicle and may eventually cause the braking system to fail in an emergency situation.

Another feature found on certain brake actuators is a reverse lockout assembly. Known reverse lock-out assemblies prevent accidental actuation of the towed vehicle brakes when the towing vehicle backs up or reverses. These known reverse lockout assemblies are not reliable because they allow for the possibility of accidental disengagement while the towing vehicle moves in reverse. Additionally, the design of these reverse lockout assemblies requires a user to manually engage and disengage the reverse lockout assembly. Inherently, this requires a user to exit the towing vehicle to engage the reverse lockout assembly, return to the towing vehicle to reverse the towing vehicle, again exit the vehicle to disengage the reverse lockout assembly, and return once more to the towing vehicle to move the towing vehicle in a forward direction. Obviously, such reverse lockout assemblies are frustrating and time consuming to use.

Thus, it would be beneficial to have a surge brake actuator that can overcome these identified problems. For example, it would be beneficial to have a surge brake actuator having a breakaway mechanism that safely and reliably operates when the actuator decouples from the towing vehicle. In addition, it also would be beneficial to have a surge brake actuator having a reverse lockout assembly that is simple to use and reliably prevents brake actuation when the assembly is engaged and the towing vehicle operates in reverse. It also would be advantageous to have a reverse lockout that reliably disengages when the towing vehicle moves forward.

SUMMARY OF THE INVENTION

Disclosed herein is a surge brake actuator that may be connected to a towing vehicle and a towed vehicle for actuating the braking system of the towed vehicle. The surge brake actuator may have a pushrod secured to a pushplate and engagable with a breakaway cam. A lanyard is securable to the towing vehicle and attaches to the breakaway cam. If the towing vehicle detaches from the towed vehicle, the lanyard may cause the breakaway cam to engage the pushplate and move the pushrod to actuate the braking system of the towed vehicle. A reverse lockout assembly may prevent actuation of the braking system of the towed vehicle and may automatically disengage upon forward motion of the towing vehicle so as to allow actuation of the braking system.

BRIEF DESCRIPTION OF THE DRAWINGS

The drawings illustrate the best mode presently contemplated for carrying out the invention. In the drawings:

FIG. 1 illustrates an exploded view of a surge brake actuator in an embodiment of the present invention.

FIG. 2 illustrates a top view of the surge brake actuator assembly of FIG. 1.

FIG. 3 is a cross-sectional view of the actuator assembly of FIG. 2 taken generally along line A-A.

FIG. 4 is an assembled and perspective view of the surge brake actuator of FIG. 1.

FIG. 5A is a perspective view of a surge brake actuator having a channel coupler in an embodiment of the present invention.

FIG. 5B is a perspective view of an actuator housing secured to a pivot hinge in an embodiment of the present invention.

FIG. 6 is a top view of a shock dampener in a collapsed position in an embodiment of the present invention.

FIG. 7 illustrates a side view of the shock dampener of FIG. 6 in an extended position.

FIG. 8 is a perspective view of the shock dampener of FIG. 7.

FIG. 9 illustrates a perspective view of a master cylinder in an embodiment of the present invention.

FIG. 10 is a cross-sectional view of the master cylinder of FIG. 9.

FIG. 11 is a perspective view of a pushrod in an embodiment of the present invention.

FIG. 12 is a top view of the pushrod of FIG. 11.

FIG. 13 is a front view of the pushrod of FIG. 12.

FIG. 19 is an exploded view of a reverse lockout assembly in an embodiment of the present invention.

FIG. 20 illustrates a cross sectional view of the reverse lockout assembly of FIG. 19 assembled to a coupler housing in an embodiment of the present invention.

DETAILED DESCRIPTION OF THE INVENTION

Figure 14:
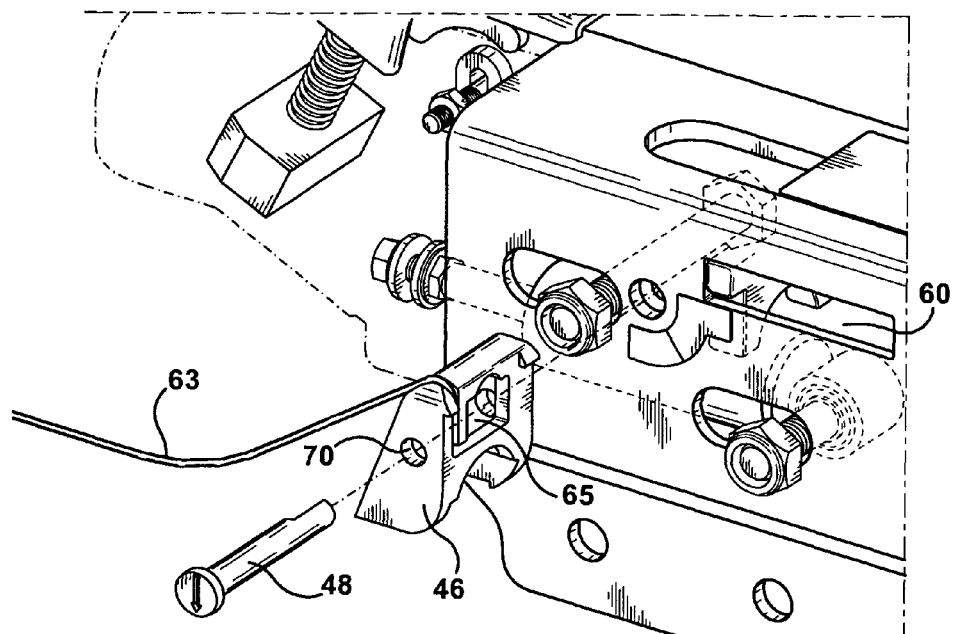
FIG. 14 is an exploded view of a surge brake actuator having a breakaway cam in an embodiment of the present invention.

Referring now to the drawings, wherein the drawings are for the purposes of illustrating preferred embodiments of the invention only and not for purposes of limiting the same, FIGS. 1-4 illustrates a surge brake actuator 10 having a coupler housing 12 and an actuator housing 14 in an embodiment of the present invention. The coupler housing 12 is securable to a towing vehicle, such as an automobile. The actuator housing 14 is connected to a towed vehicle, such as a trailer. The coupler housing 12 moves telescopically with respect to the actuator housing 14 to engage and disengage the braking system of the towed vehicle.

The actuator housing 14 is preferably constructed of a rigid and durable material, such as metal. The actuator housing 14 may be mounted to the towed vehicle frame by, for example, bolts (not shown) extending through openings 15 in the actuator housing 14. The actuator housing 14 not only provides an aesthetically pleasing appearance but also protects the components within the surge brake actuator 10. The actuator housing 14 has an opening or aperture 13 to permit debris, such as road debris and other foreign substances to pass through the actuator housing 14 and prevent impeding actuation, as best illustrated in FIG. 4.

Figure 22B:
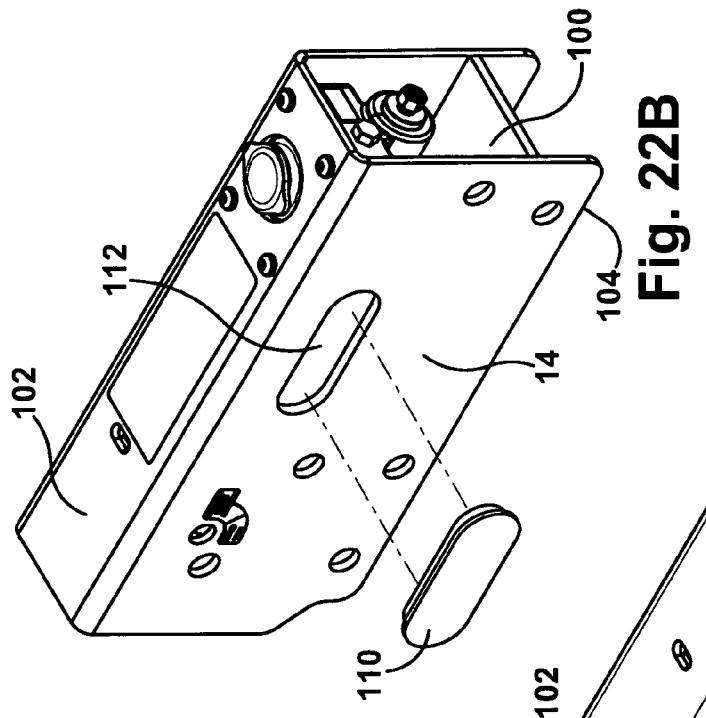
FIG. 22B illustrates an actuator housing having an access aperture and a cap in another embodiment of the present invention.
Figure 22A:
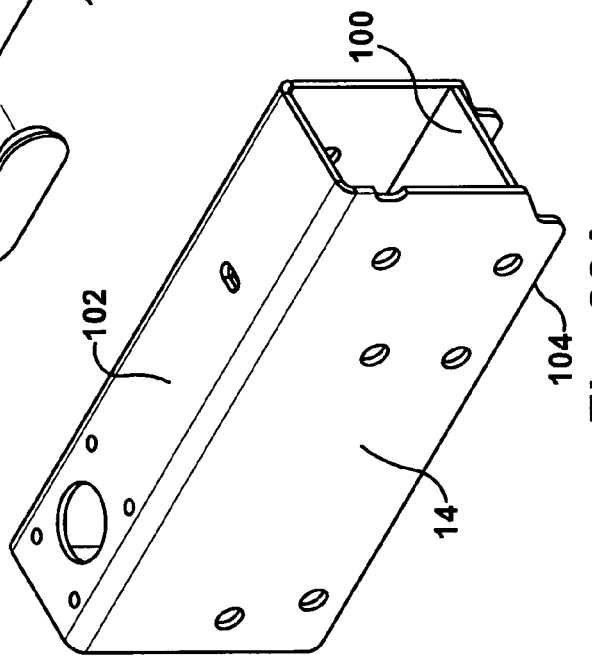
FIG. 22A illustrates an actuator housing having a plate in an embodiment of the present invention.

FIGS. 22A and 22B illustrate alternative embodiments of the actuator housing 14. In such an embodiment, a plate 100 is connected to and/or integral with the actuator housing 14. The plate 100 may extend substantially horizontal to the top side 102 of the actuator housing 14. The plate 100 may be adjacent to a bottom side 104 of the actuator housing 14. The plate 100 may prevent debris from entering into the actuator housing 14. FIG. 22B illustrates an access aperture 112 and cap 110 for covering and securing to the access aperture 112. The access aperture 112 may ease in assembly of the surge brake actuator 10 either during manufacture or by a user of the surge brake actuator 10.

As shown in FIG. 1, the coupler housing 12 advantageously has an inner tube portion 17 and a hitch portion 19. In a preferred embodiment, the inner tube portion 17 and the hitch portion 19 are integrally formed. In an embodiment, the inner tube portion 17 and the hitch portion 19 may be cast into a single component, such as, by die casting, a lost-wax process, sand casting or other process that will be appreciated by one of ordinary skill in the art. The hitch portion 19 of the coupler housing 12 may have a ball-type hitch 20, as illustrated in FIG. 3, that can be rigidly and removably connected to, for example, a ball mount of the towing vehicle. A locking assembly 21 secures the coupler housing 12 to the towing vehicle. The ball-type hitch 20 and the locking assembly 21 interact so as to prevent the hitch 20 from detaching as the towing vehicle pulls the towed vehicle.

In an alternative embodiment, as shown in FIG. 5A, the coupler housing 12 has an adjustable channel portion 22 instead of the ball-type hitch 20. The adjustable channel portion 22 may have a plurality of apertures 23 to secure the coupler housing 12 to the towing vehicle at the desired height. Accordingly, the channel portion 22 may allow connection to various types, makes, and models of towing vehicles. The coupler housing 12 of the present invention may be modified to secure to any towing vehicle, as will be appreciated by one of ordinary skill in the art.

FIG. 5B illustrates an alternative embodiment of a surge brake actuator 10 connected to a pivot hinge 24 that may be attached to the actuator housing 14. In such an embodiment, the actuator housing 14 may be an in-line housing having a relatively long length. It may, therefore, be advantageous to reduce the length of the assembly by pivoting the coupler housing 14 with respect to the tongue of the towed vehicle and/or trailer. The pivot hinge 24 may have a two-piece hinged body that is separable at a predetermined angle so as to reduce the amount of force transmitted to the pivot hinge 24. One of ordinary skill in the art will appreciate that the surge brake actuator 10 may be used with various actuator housings, components, accessories and other hitch features.

As illustrated in FIGS. 1-5B, the coupler housing 12 telescopically engages the actuator housing 14 such that the coupler housing 12 extends and retracts within the actuator housing 14 in a telescopic fashion. During operation, the coupler housing 12 is connected and secured to the towing vehicle. Movement of the towing vehicle translates into movement of the coupler housing 12 with respect to the actuator housing 14. For example, forward movement of the towing vehicle extends the coupler housing 12 relative to the actuator housing 14. In such an extended position, the towing vehicle is not braking. During braking of the towing vehicle, the coupler housing 12 is in a retracted position relative to the actuator housing 14.

As shown FIGS. 1 and 3, slide channels 7, 9 may be attached to the coupler housing 12. The slide channels 7, 9 may be molded from plastic and may be able to withstand high compression loads. Because the slide channels 7, 9 may be positioned between the coupler housing 12 and the actuator housing 14, the slide channels 7, 9 may have a low coefficient of friction. In such an embodiment, the slide channels 7, 9 may slide on the inner wall of the actuator housing 14 to reduce frictional loss between the actuator housing 14 and the coupler housing 12.

The slide channels 7, 9 may have rails 11 along the longitudinal edges of the slide channels 7, 9. The rails 11 may prevent the slide channels 7, 9 from moving laterally on the coupler housing 12. In addition, the rails 10 may contact the sides of the actuator housing 14 to ease in movement of the coupler housing 12 with respect to the actuator housing 14.

A shock dampener 23 may have one end connected to the coupler housing 12 and the opposite end connected to the actuator housing 14, as illustrated in FIGS. 1 and 3. The shock dampener 23 is movable from a extended position, as shown in FIG. 7, to a collapsed position, as shown in FIG. 6. To smooth out any oscillating or jerking motion between the coupler housing 12 and the actuator housing 14, the shock dampener 23 may be utilized to dampen the inertia of the towed vehicle. For example, the shock dampener 23 may resist sudden or spontaneous retractions of the coupler housing 12 within the actuator housing 14. An elastic or resilient member 25 may attach to the shock dampener 23, as shown in FIGS. 6-8. The member 25 may cushion or otherwise aid in dampening vibrations and spontaneous movements of the coupler housing 12 with respect to the actuator housing 14. In one embodiment, the surge brake actuator 10 may incorporate multiple shock dampeners 23.

FIGS. 1 and 3 illustrate a braking actuator 30 that may be connected to and/or within the actuator housing 14. In a preferred embodiment, the braking actuator 30 is a master cylinder 32 that is operably connected to the brakes of the towed vehicle, as best shown in FIGS. 9 and 10. In one embodiment, the master cylinder 32 is a hydraulic master cylinder that utilizes hydraulic fluid to convert force from the stopping or slowing towing vehicle so as to properly actuate the braking system of the towed vehicle.

The master cylinder 32 may be bolted or otherwise secured to the actuator housing 14. The master cylinder 32 may have a fluid reservoir 34 for storing hydraulic brake fluid, as illustrated in FIG. 10. The brakes of the towed vehicle may be actuated and disengaged depending on the fluid pressure of the master cylinder 32. A cap 35 may secure the fluid within the fluid reservoir 34. In an embodiment, the cap 35 may secure to the top of the master cylinder 32.

The top of the master cylinder 32 may have grooves 33 for moving hydraulic fluid away from the top of the master cylinder 32. The grooves 33 may be used to drain hydraulic brake fluid that may be spilled on the top of the master cylinder 32, such as during filling of the fluid reservoir 34. The grooves 33 may be used to prevent fluid from corroding the top of the master cylinder 32.

A dust boot 36 may be positioned on an end of the master cylinder 32 adjacent to the coupler housing 12. The dust boot 36 may prevent foreign particles, such as dirt, from entering the fluid reservoir 34. In one embodiment, the master cylinder 32 may have a piston 37 and a spring 39, which may be a compression spring. The piston 37 may compress the spring 39 to drive fluid through the master cylinder 32 and actuate the braking system of the towed vehicle. The spring 39 may return the piston back to a "neutral" position in which fluid may again enter the chamber defined by the piston 37.

A pushrod assembly 40 may connect the coupler housing 12 and the braking system 30, as shown in FIGS. 1 and 3. The pushrod assembly 40 may be positioned within the actuator housing 14. Turning now to FIGS. 11-13, the pushrod assembly 40 may comprise a pushrod 42, a pushplate 43, a spring 44, a washer 45, a breakaway cam 46, and a first pin 47.

The pushrod assembly 40 is positioned such that the pushrod 42 moves into and retracts from the master cylinder 32. For example, in FIGS. 11-13, the pushrod 42 may extend through the dust boot 36 and into the body of the master cylinder 32. In a preferred embodiment, the pushrod 42 moves the piston 37 and compresses the spring 39 to drive fluid out of the master cylinder 32. The pushrod 42 moves into the master cylinder 32 to actuate the braking system of the towed vehicle and retracts out of the master cylinder 32 to stop the actuation or otherwise disengage the braking system of the towed vehicle.

As illustrated in FIGS. 11-13, the pushrod 42 may be an offset pushrod that preserves space within the coupler housing 12 and the actuator housing 14 by reducing the longitudinal or straight length of the surge brake actuator 10. The pushrod 42 may resist deformations that may be generated by abrupt compressive loads. For example, the offset design of the pushrod 42 may effectively separate the pushrod 42 into two shorter sections that can better resist bending due to compression forces. In such an embodiment, the pushrod 42 may have an angled portion located between substantially straight portions. As shown in FIGS. 3 and 10, the straight portion of the pushrod 42 adjacent to the towed vehicle may engage the master cylinder 32.

The washer 45 is positioned on the pushrod 42. The washer 43 maintains the position of the spring 44 on the pushrod 42. For example, the spring 44 may be a compression spring encircling the pushrod 42 between the towing vehicle and the washer 45. The spring 44 protects the master cylinder 32 by dampening or softening abrupt movement of the pushrod 42 into the master cylinder 32. The spring 44 may act as a pressure regulator and allow the master cylinder 32 to operate at a predetermined pressure. To this end, the spring 44 may slightly resist movement of the pushrod 42 into the master cylinder 32.

In operation, when the towing vehicle brakes, the pushrod 42 protrudes into the master cylinder 32 and may force hydraulic fluid out of the master cylinder 32 to actuate the braking system of the towed vehicle. When the towing vehicle accelerates or otherwise moves in a forward direction, the coupler housing 12 may retract or otherwise move out of the actuator housing 14.

The pushrod 42 may be connected to and/or secured to the pushplate 43. The pushplate 43 may be cast, such as die cast, wax cast, or sand cast. A first pin 47 may secure the pushplate 43 to the pushrod 42. The first pin 47 may be tapered such that the diameter of the first pin 47 gradually increases from one end to the opposite end.

The present invention should not be deemed as limited to securing the pushplate 43 to the pushrod 42 via the first pin 47. One of ordinary skill in the art will appreciate that the pushplate 43 may be secured to the pushrod 42 in numerous ways. For example, the pushrod 42 may be threadedly engaged with the pushplate 43 and/or bolted to the pushrod 42.

Protrusions 52 extend outward from the pushplate 43. The protrusions 52 may extend through the coupler housing 12. For example, the coupler housing 12 may have channels 60 on opposing sides of the coupler housing 12. The pushplate 42 may move longitudinally through the coupler housing 12 and the actuator housing 14. The protrusions 52 may move along the channels 60 with the pushrod 42.

The surge brake actuator 10 may incorporate a lanyard 63 to engage the brakes of the towed vehicle during breakaways. The lanyard 63 may have one end secured to the towed vehicle and the opposing end secured to the surge brake actuator 10.

During a breakaway, the towing vehicle may pull the lanyard 63 and sever and/or otherwise disconnect the lanyard 63 from the towed vehicle.

The breakaway cam 46 may be positioned so as to engage the pushplate 43. In a preferred embodiment, the breakaway cam 46 may pivot to engage the pushplate 43 and drive the pushrod 42 into the master cylinder 32. For example, during a breakaway, the breakaway cam 46 may move to a horizontal position and, in turn, move the pushrod 42 into the master cylinder 32 so as to actuate the braking system of the towed vehicle. Advantageously, the actuator housing 14 and/or the coupler housing 12 may have a slot 44 (or opening) for manually releasing or disengaging the pushplate 43 from the breakaway cam 46.

Figure 15:
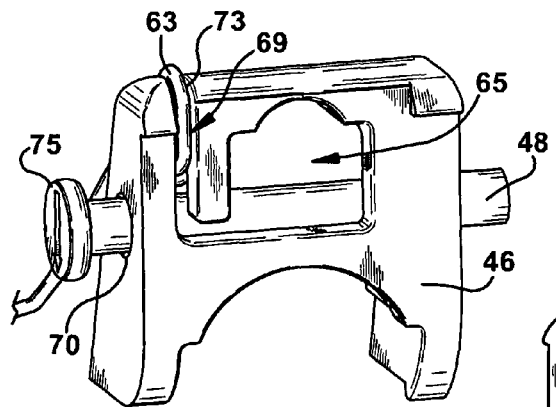
FIG. 15 is a front view of a breakaway cam connected to a lanyard in an embodiment of the present invention.
Figure 16:
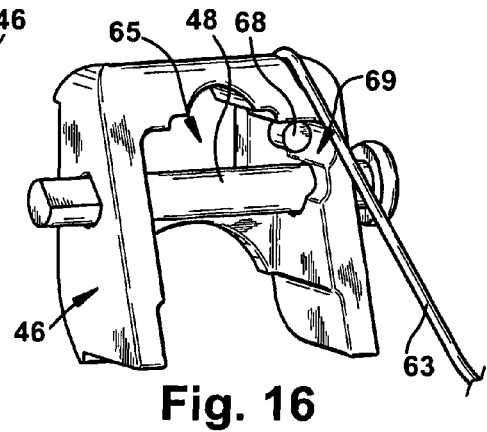
FIG. 16 is a rear view of the breakaway cam of FIG. 15.
Figure 17:
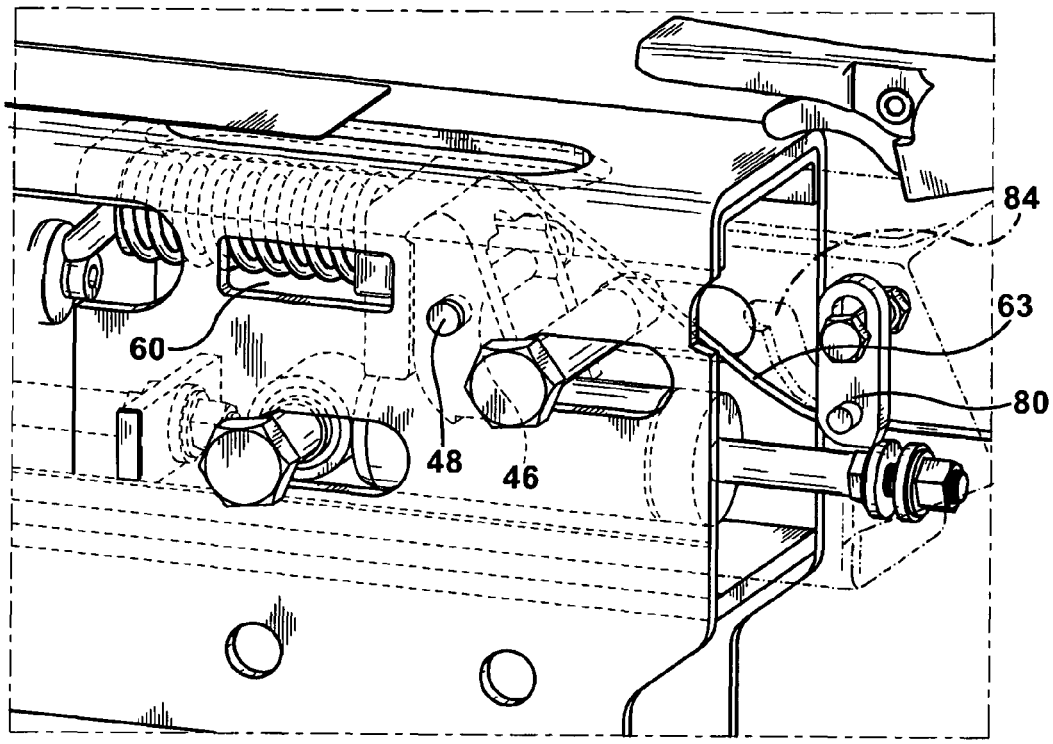
FIG. 17 is a perspective view of a surge brake actuator having a breakaway cam in a first position in an embodiment of the present invention.

The breakaway cam 46 may have a notch 65 sized and shaped to engage the pushplate 43 and the lanyard 63, as shown in FIGS. 14-16. For example, the notch 65 of the breakaway cam 46 may be an opening with a slot portion 69 extending therefrom. In one embodiment, the lanyard 63 may have a ferrule end 68 for engagement with the groove or the channel portion of the notch 65. For example, the lanyard 63 may extend from the towing vehicle into the coupler housing 12 and/or the actuator housing 14. The lanyard 63 may be positioned over the top of the breakaway cam 46 and into the slot portion 69.

The top of the breakaway cam 46 may have a groove 73, as best illustrated in FIG. 15. The groove 73 may correspond in shape, size, and/or width to the lanyard 63. The groove 73 may prevent or at least minimize lateral movement of the lanyard 63. The lanyard 63 may move, slide, or otherwise move longitudinally through the groove 73. In an embodiment, the bottom of the breakaway cam 46 is sized and shaped to straddle the shock dampener 23. To this end, the envelope size of the surge brake actuator 10 is minimized and/or compressed.

The breakaway cam 46 may have apertures 70 such that the second pin 48 may extend therethrough. The second pin 48 may prevent the lanyard 63 from moving out of the slot portion 69. In other words, the second pin 48 may retain the end of the lanyard 63 toward the top of the slot portion 69. The breakaway cam 46 may pivot about the second pin 48. In one embodiment, the second pin 48 may extend through the breakaway cam 46, the coupler housing 12, and/or the actuator housing 14.

The second pin 48 may have a shape for engagement with the breakaway cam 46, the coupler housing 12, and/or the actuator housing 14. In such an embodiment, the apertures 70 of the breakaway cam 46 may correspond in shape to the shape of the second pin 48. FIGS. 14-16 illustrate an embodiment where the second pin 48 has a D-shaped cross-section.

Figure 18:
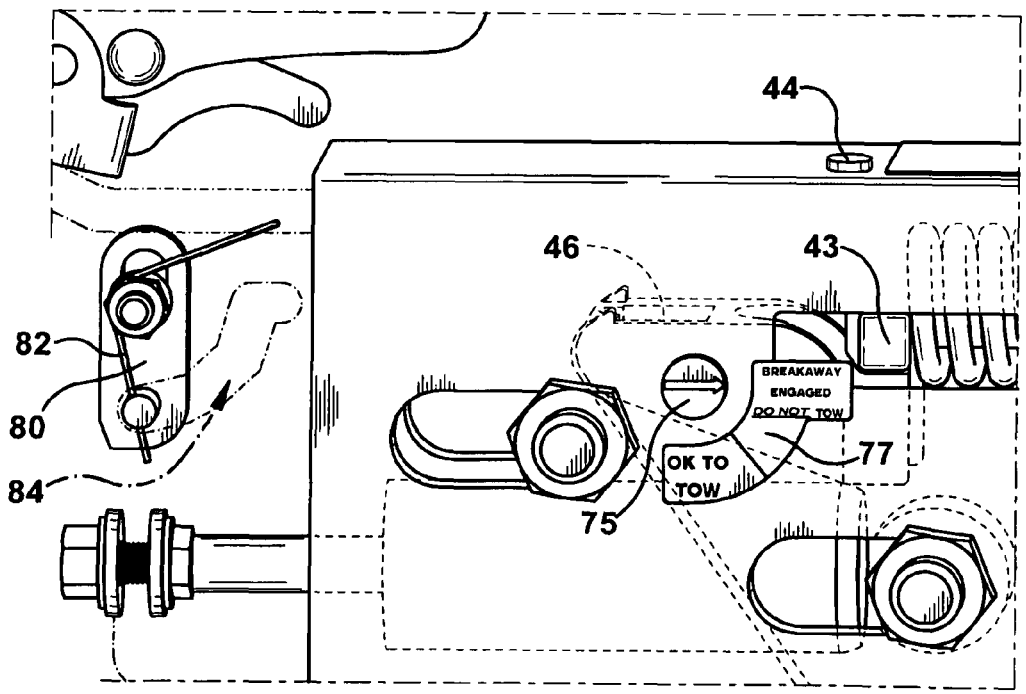
FIG. 18 is a side view of a surge brake actuator having a breakaway cam in a second position in an embodiment of the present invention.

One end of the second pin 48 may have an indicator 75 to illustrate the position of the breakaway cam 46 relative to the pushplate 43. The indicator 75 may be, for example, an arrow, a line, a groove, or other distinguishing feature capable of indicating position of the breakaway cam 46. As illustrated in FIGS. 14, 15, and 18, in one embodiment, the indicator 75 may be an arrow.

The actuator housing 14 may have a decal 77 corresponding to the indicator 75. For example, as shown in FIG. 18, the decal 77 may comprise the terms "OK TO TOW" and "BREAKAWAY ENGAGED DO NOT TOW." The indicator 77 may be, for example, color-coded to facilitate the location of the breakaway cam 46 to a user of the surge brake actuator 10. Of course, the present invention should not be deemed as limited to any specific indicator 75 and decal 77. The indicator 75 and the decal 77 may be any combination of words, symbols, colors, or the like that are capable of indicating the position of the breakaway cam 46.

Advantageously, the present invention may have an improved reverse lockout assembly 79 comprising a lever 80, a spring 82, and/or a lockout groove 84. The reverse lockout assembly 79 may prevent telescopic movement of the coupler housing 12 with respect to the actuator housing 14. For example, the reverse lockout assembly 79 may be engaged when reversing the towing vehicle and/or the towed vehicle such that the braking system of the towed vehicle does not engage.

The reverse lockout assembly 79 of the present invention is capable of being moved to a locked position, in which the coupler housing 12 is prevented from retreating into the actuator housing 14. The reverse lockout assembly 79 may move to an operating position, in which the coupler housing 12 and the actuator housing 14 telescopically move to engage the braking system of the towed vehicle. To overcome one of the many deficiencies of the prior art, forward motion of the towing vehicle and/or the towed vehicle moves the reverse lockout assembly 79 from the locked position to the normal operating position without manual movement of the lever 80 of the reverse lockout assembly.

Figure 21:
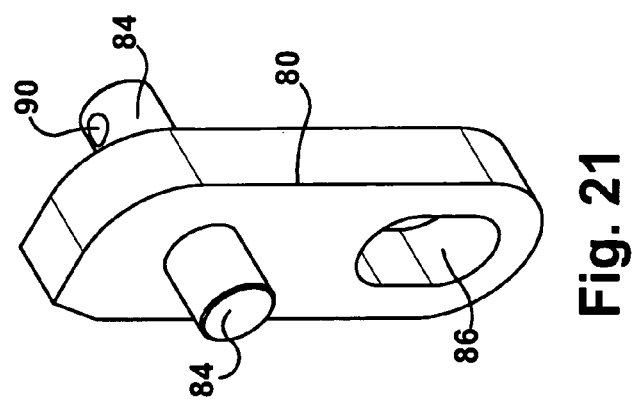
FIG. 21 illustrates a lever that may be incorporated into the reverse lockout assembly in an embodiment of the present invention.

As illustrated in FIG. 21, an embodiment of the lever 80 having protuberances 84 adjacent to one end of the lever 80 is provided. A first aperture 86 may be located at the opposite end of the lever 80. The lever 80 may be secured to the actuator housing 14 via, for example, the first aperture 86. FIG. 20 illustrates the lever 80 secured to and/or attached to the coupler housing 12. For example, a bolt 87 may extend through the first aperture 86 so as to secure the lever 80 to the coupler housing 12.

A second aperture 90 may extend through one of the protuberances 84. The second aperture 90 may be sized to receive the spring 82. In a preferred embodiment, the spring 82 is a torsion spring, as best illustrated in FIG. 19. The spring 82 may extend through the protuberance 84 and may bias the lever 80 in an operating position. The coupler housing 12 and the actuator housing 14 may telescopically move with respect to each other while in the operating position.

The lockout groove 84 extends in an arc-like manner from the operating position to the locking position. The protuberance 84 extends from the lever 80 so as to engage the lockout groove 84. The spring 82 biases the protuberance 84 into the operating position, in which the coupler housing 12 and the actuator housing 14 are freely movable. The protuberance 84 may be moved into the locking position so as to prevent telescopic movement of the coupler housing 12 and the actuator housing 14.

The lockout groove 84 may have a portion extending longitudinally toward the actuator housing 14 when in the locking position. To this end, the protuberance 84 may slide or otherwise move toward the actuator housing 14. The portion of the lockout groove 84 extending toward the actuator housing 14 may prevent the protuberance 84 from moving to the operating position until the towing vehicle moves in a forward direction. Accordingly, upon forward movement of the towing vehicle, the protuberance 84 may move out of the portion extending longitudinally toward the actuator housing 14, and the spring 82 may bias the protuberance 84 into the operating position. Advantageously, in such an embodiment, a user of the surge brake actuator 10 may be able to move the lever 80 to the locking position so as to reverse the towing vehicle, and the lever 80 may automatically move to the operating position upon forward movement of the towing vehicle.

One of ordinary skill in the art that the novel features and aspects of the present invention may be modified as required or preferred based on the towing vehicle and/or the towing vehicle. For example, aspects of the present invention that may be modified include the actuator housing 14, the coupler housing 12, how the coupler housing 12 is secured to the towing vehicle, the braking system and the lockout assembly 79. The housings 12, 14 may be custom mount housings, an a-frame mount housings, over the tongue mount housings, or inline housings. The adjustable channel portion 22 may accept couplers, lunette rings and/or the like. The coupler housing 12 may secure to the towing vehicle by, for example, a 2" coupler, a 2⅝" coupler, or other coupler as will be appreciated by those of ordinary skill in the art. The present invention may be compatible or modified to be compatible with any type of braking system of a towed vehicle, such as a disc braking system or a drum braking system. In addition, the elements of the present invention may be modified to be operable with actuators of different sizes and/or capacities, such as, a 12.5K actuator. Of course, other lockout assemblies may also be used with the present invention, for example solenoid lockout assemblies.

Although the preferred embodiment of the present invention has been illustrated in the accompanying drawing and described in the foregoing detailed description, it is to be understood that the present invention is not to be limited to just the preferred embodiment disclosed, but that the invention described herein is capable of numerous rearrangements, modifications and substitutions without departing from the scope of the claims hereafter.

What is claimed is:

1. A surge brake actuator for actuating a braking system of a towed vehicle, the surge brake actuator comprising:
    a pushrod operably connectable to the braking system of the towed vehicle;
    a breakaway cam housed within an actuator housing and engagable with the pushrod, the breakaway cam being pivotable between a first position that engages the braking system and a second position that disengages the braking system; and
    a slot formed in the breakaway cam, the slot being sized and shaped to receive a lanyard.

2. The surge brake actuator of claim 1 wherein the breakaway cam is manually releasable from the pushrod.

3. The surge brake actuator of claim 1 further comprising:
    a pivot pin inserted through the breakaway cam, the pivot pin defining an axis about which the breakaway cam pivots.

4. The surge brake actuator of claim 3 wherein the pivot pin is positioned adjacent the slot to maintain a lanyard.

5. The surge brake actuator of claim 4 wherein the pivot pin has an indicator located on one end of the pivot pin to indicate the position of the breakaway cam.

6. The surge brake actuator of claim 4 wherein the pivot pin has a D-shaped cross-section.

7. The surge brake actuator of claim 1 wherein the pushrod is an offset pushrod.

8. The surge brake actuator of claim 1 further comprising:
    a coupler housing having an integral coupler portion and tube portion.

9. The surge brake actuator of claim 8 further comprising:
    an actuator housing attachable to the towed vehicle, the actuator housing being telescopically movable with respect to the coupler housing.

10. The surge brake actuator of claim 9 further comprising:
    a reverse lockout assembly connected to the coupler housing, wherein the reverse lockout assembly is capable of preventing movement of the coupler housing with respect to the actuator housing while in a locked position.

11. The surge brake actuator of claim 10 wherein the reverse lockout assembly is capable of moving from the locked position to an operating position upon forward movement of a towing vehicle, the operating position allowing the coupler housing to freely move with respect to the actuator housing.

12. A surge brake actuator for actuating a braking system of a towed vehicle, the surge brake actuator comprising:
    a coupler housing capable of securing to a towing vehicle;
    an actuator housing telescopically connected to the coupler housing, the actuator housing being capable of securing to the towed vehicle; and
    a reverse lockout assembly movable within a groove of the coupler housing from a locked position to an operating position, the locked position preventing movement of the coupler housing with respect to the actuator housing and the operating position permitting movement of the coupler housing with respect to the actuator housing, wherein the reverse lockout assembly moves from the locked position to the operating position upon forward movement of the coupler housing.

13. The surge brake actuator of claim 12 wherein the reverse lockout assembly comprises a lever movable within the groove from the locked position to the operating position.

14. The surge brake actuator of claim 13 further comprising:
    a torsion spring biasing the lever in the operating position.

15. The surge brake actuator of claim 14 wherein the groove has a portion extending longitudinally toward the actuator housing so as to prevent movement of the lever to the operating position unless the coupler housing moves away from the actuator housing.

16. The surge brake actuator of claim 15 further comprising:
    an offset pushrod operably connectable to the braking system of the towed vehicle.

17. The surge brake actuator of claim 16 further comprising:
    a breakaway cam engagable with the pushrod, the breakaway cam pivotable between a first position that actuates the braking system and a second position that disengages the braking system.

18. The surge brake actuator of claim 17 further comprising:
    a slot in the breakaway cam sized to receive a lanyard such that movement of the lanyard in a direction away from the towed vehicle causes the breakaway cam to pivot from the second position to the first position.

19. The surge brake actuator of claim 18 further comprising:
    a pivot pin secured to the breakaway cam wherein the pivot pin and the breakaway cam rotate together.

20. A surge brake actuator capable of connection to a towing vehicle and actuation of a braking system of a towed vehicle, the surge brake actuator comprising:
    a coupler housing securable to a towing vehicle;
    an actuator housing connectable to the towed vehicle, the actuator housing being telescopically movable with respect to the coupler housing;
    a reverse lockout assembly movable within a groove of the coupler housing from a locked position to an operating position, the locked position preventing movement of the coupler housing with respect to the actuator housing and the operating position permitting movement of the coupler housing with respect to the actuator housing, wherein the reverse lockout assembly moves from the locked position to the operating position upon forward movement of the coupler housing; and a breakaway cam pivotable between a first position that disengages the braking system and a second position that actuates the braking system.

* * * * *